(12) United States Patent
Park et al.

(10) Patent No.: US 12,034,835 B2
(45) Date of Patent: Jul. 9, 2024

(54) MANAGING ENCRYPTION KEYS FOR CONTENT

(71) Applicant: COMCAST CABLE COMMUNICATIONS, LLC, Philadelphia, PA (US)

(72) Inventors: Kyong Park, Philadelphia, PA (US); Nikola Kolev, Devon, PA (US); Jason Burgess, Highlands Ranch, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 841 days.

(21) Appl. No.: 15/885,482

(22) Filed: Jan. 31, 2018

(65) Prior Publication Data
US 2019/0238321 A1 Aug. 1, 2019

(51) Int. Cl.
| | |
|---|---|
| H04L 9/08 | (2006.01) |
| H04L 9/40 | (2022.01) |
| H04N 21/2347 | (2011.01) |
| H04N 21/235 | (2011.01) |
| H04N 21/4627 | (2011.01) |
| H04N 21/845 | (2011.01) |

(52) U.S. Cl.
CPC .............. *H04L 9/08* (2013.01); *H04L 63/068* (2013.01); *H04N 21/2347* (2013.01); *H04N 21/2351* (2013.01); *H04N 21/4627* (2013.01); *H04N 21/8456* (2013.01)

(58) Field of Classification Search
CPC ..... H04L 9/08; H04L 63/068; H04N 21/2347; H04N 21/8456; H04N 21/4627; H04N 21/2351; G06F 21/10
See application file for complete search history.

(56) References Cited

U.S. PATENT DOCUMENTS

| | | | | |
|---|---|---|---|---|
| 8,081,756 B2* | 12/2011 | Fang | ..................... | G06F 21/10 380/228 |
| 8,402,556 B2* | 3/2013 | Bradley | .................. | G06F 21/10 726/30 |
| 8,677,428 B2* | 3/2014 | Lewis | .............. | H04N 21/44016 725/36 |
| 8,892,763 B2* | 11/2014 | Moorthy | .......... | H04N 21/23406 709/231 |
| 8,983,076 B2* | 3/2015 | Swaminathan | ....... | H04L 9/0819 380/278 |
| 9,160,540 B2* | 10/2015 | Xu | ........................ | H04L 9/3247 |
| 10,142,386 B2* | 11/2018 | Gordon | .............. | H04N 21/8456 |
| 10,162,943 B2* | 12/2018 | Park | ....................... | H04L 9/088 |
| 2005/0132207 A1* | 6/2005 | Mourad | ................. | G06Q 10/10 713/189 |
| 2008/0282357 A1* | 11/2008 | Sharpe | ................. | G06F 21/6209 726/27 |
| 2012/0017282 A1* | 1/2012 | Kang | .................. | H04N 21/8456 726/26 |
| 2012/0331293 A1* | 12/2012 | Ma | ..................... | H04N 21/4627 713/168 |

(Continued)

*Primary Examiner* — Oleg Korsak
(74) *Attorney, Agent, or Firm* — Ballard Spahr LLP

(57) ABSTRACT

Disclosed are systems and methods for encryption key management. Content items, or portions thereof, can be assigned to a plurality of partitions. Each of the plurality of partitions can correspond to a timeframe of encryption key rotation. Cache control can be applied to manifests and/or content based on the timeframe of encryption key rotation.

27 Claims, 6 Drawing Sheets

(56) References Cited

U.S. PATENT DOCUMENTS

| | | | |
|---|---|---|---|
| 2013/0166906 A1* | 6/2013 | Swaminathan | H04N 21/8456 713/155 |
| 2013/0227293 A1* | 8/2013 | Leddy | H04N 21/845 713/176 |
| 2013/0239145 A1* | 9/2013 | Broome | H04N 21/23418 725/41 |
| 2013/0275549 A1* | 10/2013 | Field | G06F 21/10 709/217 |
| 2015/0074818 A1* | 3/2015 | Watson | H04N 21/6334 726/27 |
| 2015/0143115 A1* | 5/2015 | Gupta | H04L 63/10 713/168 |
| 2015/0271541 A1* | 9/2015 | Gonder | H04L 65/608 725/134 |
| 2016/0014439 A1* | 1/2016 | Friedrich | H04N 21/8543 725/92 |
| 2016/0099805 A1* | 4/2016 | Giladi | H04L 65/762 713/150 |
| 2016/0127895 A1* | 5/2016 | Bangole | H04W 12/0804 380/279 |
| 2016/0198202 A1* | 7/2016 | Van Brandenburg | H04N 21/2347 725/31 |
| 2016/0285870 A1* | 9/2016 | Poornachandran | H04L 63/0876 |
| 2016/0323606 A1* | 11/2016 | Mao | H04L 67/02 |
| 2016/0371468 A1* | 12/2016 | Daniel | G06F 21/10 |
| 2017/0099136 A1* | 4/2017 | Straub | H04L 9/0819 |
| 2017/0147830 A1* | 5/2017 | Park | G06F 21/121 |
| 2017/0238040 A1* | 8/2017 | Huysegems | H04L 67/26 725/116 |
| 2018/0137208 A1* | 5/2018 | Ricker | G06F 16/435 |

* cited by examiner

MANAGING ENCRYPTION KEYS FOR CONTENT

BACKGROUND

Content transmitted to user devices may be encrypted using encryption keys. Periodically, the encryption key used to encrypt content can be changed. For example, if a given encryption key is compromised, a new encryption key may be needed to encrypt content. As another example, policies may dictate periodic changes in which encryption keys are used to encrypt content. User devices possessing decryption keys corresponding to deprecated encryption keys may experience errors. These and other shortcomings are addressed by the approaches set forth herein.

SUMMARY

It is to be understood that both the following general description and the following detailed description are exemplary and explanatory only and are not restrictive. Provided are methods and systems for managing encryption keys for content (e.g., content items). Content items can be assigned to a partition of a plurality of partitions, with each partition corresponding to a corresponding time of encryption key rotation. A partition can be a logical grouping of content items, or a logical grouping of portions of a content item. Content items can be grouped by, for example, according to a class of content, a genre or category of content, or according to other attributes. Encryption key rotation can be a process of discontinuing use of one encryption key in favor of another. A request for a manifest associated with a content item can be sent by a user device and can be received by an edge device, for example. In response to determining that a valid instance of the manifest is not stored, a request for a valid instance of the manifest can be transmitted, for example by the edge device to a manifest server. A valid instance of a manifest is a manifest having an encryption key that is not due for rotation. A valid instance of the manifest can be received by the edge device. The valid instance of the manifest can comprise an entry describing one or more attributes of a digital rights management (DRM) scheme, hereinafter referred to as a DRM entry. The DRM entry can be associated with a first encryption key and a cache control header (e.g., the Cache-Control header used in HyperText Transfer Protocol (HTTP)) based on the corresponding time of encryption key rotation. The cache control header can describe one or more attributes used by the user device in caching the manifest, e.g., how long to cache the manifest, when to delete the manifest from the cache. The valid instance of the manifest can be transmitted to the user device.

The user device can utilize the valid instance of the manifest to retrieve/receive one or more content segments of the content items. The one or more content segments can be encrypted according to the first encryption key. When it is determined that the corresponding time of encryption key rotation has occurred, another manifest comprising a DRM entry associated with a second encryption key can be requested by and/or generated/transmitted to the user device. At least one second content segment of the content item encrypted according to the second encryption key can be transmitted to the user device. The user device can utilize the another manifest to continue to retrieve/receive one or more content segments of the content items encrypted using the second encryption key.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
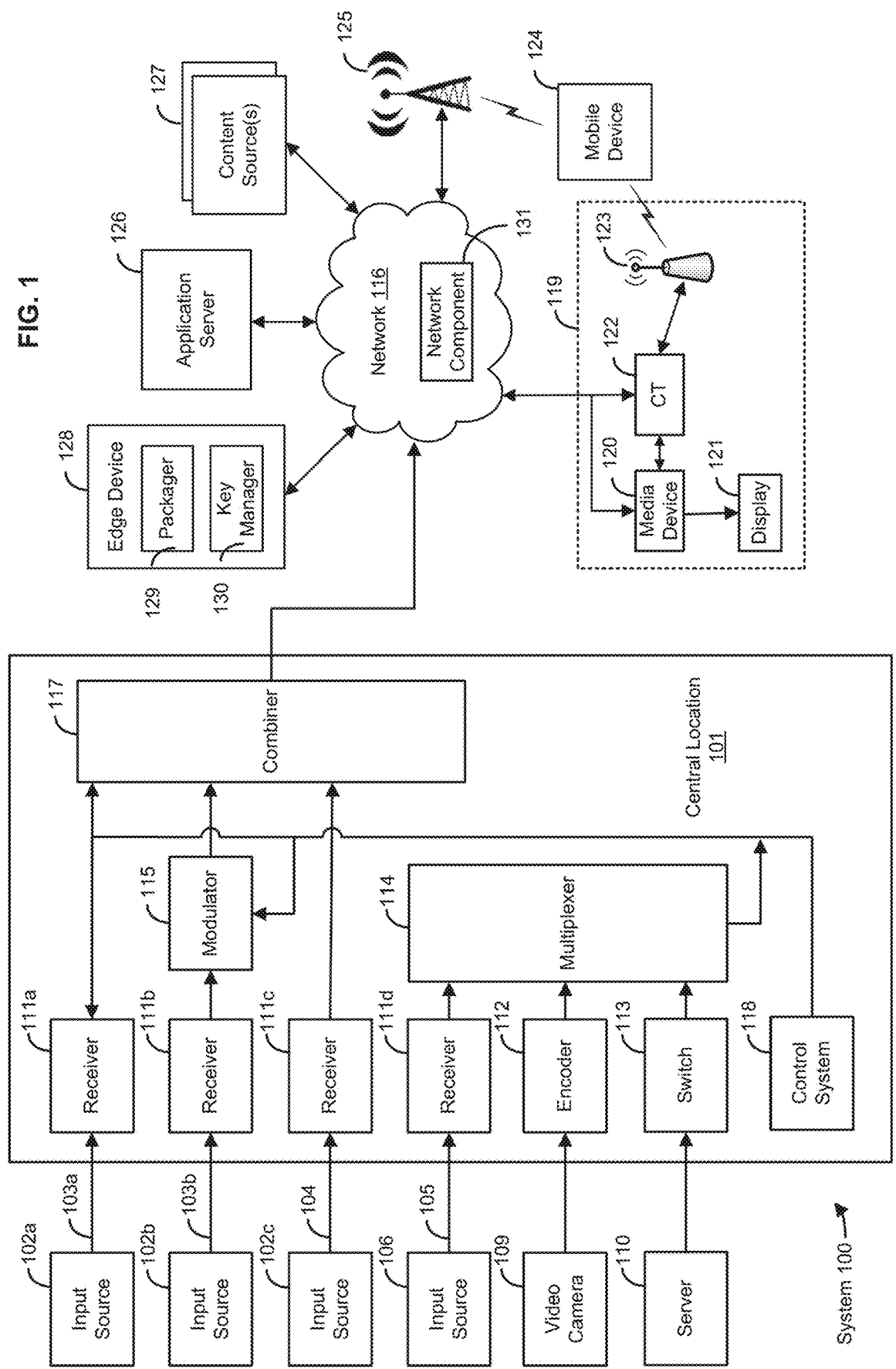
FIG. 1 is a diagram of an example content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (PDF), Electronic Publication (EPUB) format created by the International Digital Publishing Forum (IDPF), JPEG (JPG) format, Portable Network Graphics (PNG) format, dynamic ad insertion data (.csv), Adobe® Photoshop® (PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to managing encryption keys for content (e.g., content items). Content items can be assigned to a respective one of plurality of partitions, or other logical groupings as can be appreciated. For example, content items can be assigned to the plurality of partitions according to a class of content, a genre or category of content, or according to other attributes. Each partition of content can be assigned a corresponding time of encryption key rotation. A time of encryption key rotation indicates a time at which one or more first encryption keys used to encrypt transmissions of content items in a respective partition is no longer used. Instead, at least one second encryption key is used to encrypt transmissions of content items in the respective partition. By assigning different times of encryption key rotation to each partition, the computational burden of associating new encryption keys with content items is distributed over time.

Given that the times of encryption key rotation are known, a manifest can be generated with a header indicating the next time of encryption key rotation. For example, a cache control header can be included in a manifest, with the cache control header indicating the next time of encryption key rotation. In response to a request for a manifest associated with a content item, it can be determined whether a valid instance of the manifest is stored, e.g., stored in a cache. For example, determining whether the valid instance of the manifest is stored can include determining that the next time of encryption key rotation as indicated in the header of a stored manifest has not passed. A valid instance of a manifest is a manifest having an encryption key that is not due for rotation. If a valid instance of the manifest is stored, the valid instance of the manifest can be transmitted to a user device. Otherwise, if a valid instance of the manifest is not stored, a request can be transmitted, e.g., to a packager, for a valid instance of the manifest. The packager can generate a valid instance of the manifest comprising a digital rights management (DRM) entry corresponding to the encryption key currently associated with the content item. The valid instance of the manifest can also comprise a header, e.g., a cache control header, indicating the next time of encryption key rotation. The valid instance of the manifest can then be transmitted to the user device. The valid instance of the manifest can also be stored, e.g., in a cache, such that subsequent requests for the manifest(s) received before the next time of encryption key rotation can be fulfilled using a stored valid instance of the manifest.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a network 116.

The central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communications terminal 122 can comprise a modem cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest (e.g., or other index file describing segments of the content), provide streaming content (e.g., unicast, multicast), provide a file transfer, and/or the like. For example, the edge device 128 can include a packager 129 configured to generate manifests for transmission to a user device. The edge device 128 can also include a key manager 130 to determine which encryption keys should be used to encrypt content transmitted by the edge device 128 to a user device. The packager 129 can encrypt content segments of a content item using the encryption keys indicated by the key manager 130. The encrypted content segments can then be transmitted by the edge device 128 to a user device. Although the packager 129 and key manager 130 are shown as components of the edge device 128, it is understood that the packager and key manager 130 can be disposed remotely from the edge device 128. The edge device 128 can cache or otherwise store content (e.g., frequently requested content) to enable faster delivery of content to users. For example, the edge device 128 can cache or otherwise store manifests generated by the packager 129 and/or encrypted instances of content segments.

For example, a request for a manifest associated with a content item can be received by the edge device 128 from a user device (e.g., the media device 120). The content item can be assigned to one of a plurality of partitions of content items, with each partition having a corresponding time of encryption key rotation. Although the following discussion describes partitions as including one or more content items, it is understood that portions of content items can also be assigned to and/or associated with a partition. For example, one or more segments of a content item can be assigned to a first partition. One or more other segments of the content item can be assigned to a second partition.

The time of encryption key rotation indicates a time at which one or more first encryption keys used to encrypt transmissions of content items in a respective partition are no longer used. After the time of encryption key rotation, at least one second encryption key is used to encrypt transmissions of content items (e.g., segments) assigned to a respective partition. The corresponding times of encryption key rotation for each of the partitions can be separated by a predefined interval, e.g., twelve hours, one day, or two days. For example, given 28 partitions of content items, a first partition can be assigned a time of encryption key rotation on the first day of every month, a second partition can be assigned a time of encryption key rotation on the second day of every month, etc. The content items can be partitioned according to a class of content, genre, length of content, frequency of access, or according to other criteria.

In response to receiving the request for the manifest associated with the content item, the edge device 128 can determine if a valid instance of the manifest is stored, e.g., in a cache. For example, the edge device 128 can determine if a manifest matching the requested manifest is stored in the cache. As another example, the edge device 128 can determine if a time indicated in cache control data of a stored manifest, e.g., a cache control header, corresponding to a time of encryption key rotation has passed. If a valid instance of the manifest is stored, the valid instance of the manifest can be loaded, e.g., from the cache, and transmitted to the user device.

Otherwise, if a valid instance of the manifest is not stored, the edge device 128 can transmit a request to the packager 129 for a valid instance of the manifest. In response to the request for a valid instance of the manifest, the packager 129 can generate a valid instance of the manifest. For example, generating a valid instance of the manifest can include transmitting, e.g., by the packager 129 to the key manager 130, a request for an encryption key corresponding to the content item associated with the manifest.

In response to the request for the encryption key, the key manager 130 can provide a previously generated encryption key corresponding to the content item. The key manager 130 can also generate an encryption key for the content item. For example, the key manager 130 can generate the encryption key for the content item based on a respective one of the partitions to which the content item is assigned, a type or version digital rights management (DRM) type to be applied to the content item, the corresponding time of encryption key rotation, or another factor. The key manager 130 can then transmit the encryption key to the packager 129. The key manager 130 can also transmit DRM metadata associated with the encryption key to the packager 129 facilitating generating the valid instance of the manifest. The DRM metadata can include an identifier for the encryption key, a decryption key corresponding to the encryption key, an identifier for the decryption key corresponding to the encryption key, an identifier of a DRM type or version associated with the content item, or the corresponding time of encryption key rotation for the partition in which the content item is included.

The packager 129 can then generate a valid instance of the manifest. The valid instance of the manifest can include the encryption key and/or the DRM metadata received from the key manager 130. The valid instance of the manifest can include cache control data matching or otherwise corresponding to the corresponding time of encryption key rotation for the content item. The cache control data can be included in a header of the manifest. For example, the cache control data can comprise a cache control header of the manifest. By including the cache control data, a user device in possession of the manifest can determine when the corresponding time of encryption key rotation has occurred. Thus, the user device can transmit a request for a new manifest, an update to a stored manifest, or for an updated encryption/decryption key, in response to the corresponding time of encryption key rotation occurring. This provides advantages over existing solutions where a user device may not be configured to determine that an encryption key has expired or has been deprecated until a failed attempt to decrypt a content segment encrypted by a new encryption key.

The valid instance of the manifest can then be transmitted, e.g., by the packager 129, to the edge device 128. The edge device 128 can store the received valid instance of the manifest in a cache to facilitate responding to subsequent requests for the manifest. For example, the edge device 128 can store the valid instance of the manifest in the cache of the edge device 128 until a time indicated by the cache control data (e.g. the cache control header) of the valid instance of the manifest.

The edge device 128 can transmit at least one content segment of a content item to a user device. For example, a user device (e.g., the media device 120) can generate requests for content segments based on Uniform Resource Locators (URLs) indicated in a first manifest. The edge device 128 can then transmit at least one requested content segment to the user device. The at least one requested content segment can be encrypted according to a first encryption key. For example, the packager 129 can encrypt the requested at least one content segment using the first encryption key, while the first manifest facilitates decryption of the requested at least one content segment by the user device. The first manifest can facilitate decryption of the at least one content segment by including, where symmetric key encryption is used, the first encryption key or an identifier of the first encryption key. The first manifest can also facilitate decryption of the at least one content segment by including, where asymmetric key encryption is used, a decryption key or an identifier of a decryption key corresponding to the first encryption key.

During a transmission of content segments of a content item to a user device, the time of encryption key rotation for the content item can occur. The edge device 128 can determine that the time of encryption key rotation has occurred in response to a request for a manifest associated with the content item or in response to a request for a content segment of the content item. In response to determining that the time of encryption key rotation has occurred, the edge device 128 can transmit a manifest to the user device corresponding to a second encryption key. For example, the edge device 128 can transmit a request to the packager 129 to generate a manifest. The generated manifest can comprise DRM metadata associated with a second encryption key. The generated manifest can also comprise a header corresponding to a next time of encryption key rotation for the content item. The header can comprise cache control data, e.g., a cache control header. The generated manifest can then be transmitted to the user device. The edge device 128 can then transmit, e.g., to the user device, content segments encrypted, e.g., by the packager 129, using the second encryption key. The user device can be configured to maintain, e.g., in a butler, a duration of content segments exceeding an estimated amount of time to request and/or receive the generated manifest, e.g., five seconds of content segments, ten seconds of content segments, etc. The estimated amount of time to request and/or receive the generated manifest can be determined based on network conditions, e.g. one or more round trip times, an estimated bandwidth of the user device. Thus, the user device can continue to render previously received content segments while requesting and/or receiving an updated manifest, prevent a user of the user device from experiencing perceptible rendering errors.

The edge device 128 can determine that a transmission of content segments of a content item is within a first predefined duration relative to the time of encryption key rotation for the content item. The first predefined duration can be based on a duration of the content item, e.g., the duration, twice the duration, three times the duration of the content item. Thus, the edge device 128 can determine that the time of encryption key rotation for the content item may occur during transmission of content segments of the content item. The edge device 128 can store, e.g., in a cache, one or more content segments encrypted using a first encryption key. The one or more content segments encrypted using a first encryption key can be stored for a second predefined duration after the corresponding time of encryption key rotation. The second predefined duration can be based on a duration of the content item, e.g., the duration, twice the duration, three times the duration of the content item. The first encryption key corresponds to a period before the time of encryption key rotation. Thus, a user device requesting content segments using a manifest corresponding to the first encryption key would be able to receive decryptable content segments from the edge device 128 after the time of encryption key rotation, thereby preventing perceptible errors in rendering content segments by a user device not having the second encryption key.

The network 116 can comprise a network component 131. The network component 131 can comprise any device, module, and/or the like communicatively coupled to the network 116. For example, the network component 131 can comprise a router, a switch, a splitter, a packager, a gateway, a encoder, a storage device, a multiplexer, a network access location (e.g., tap), physical link, and/or the like.

Figure 2:
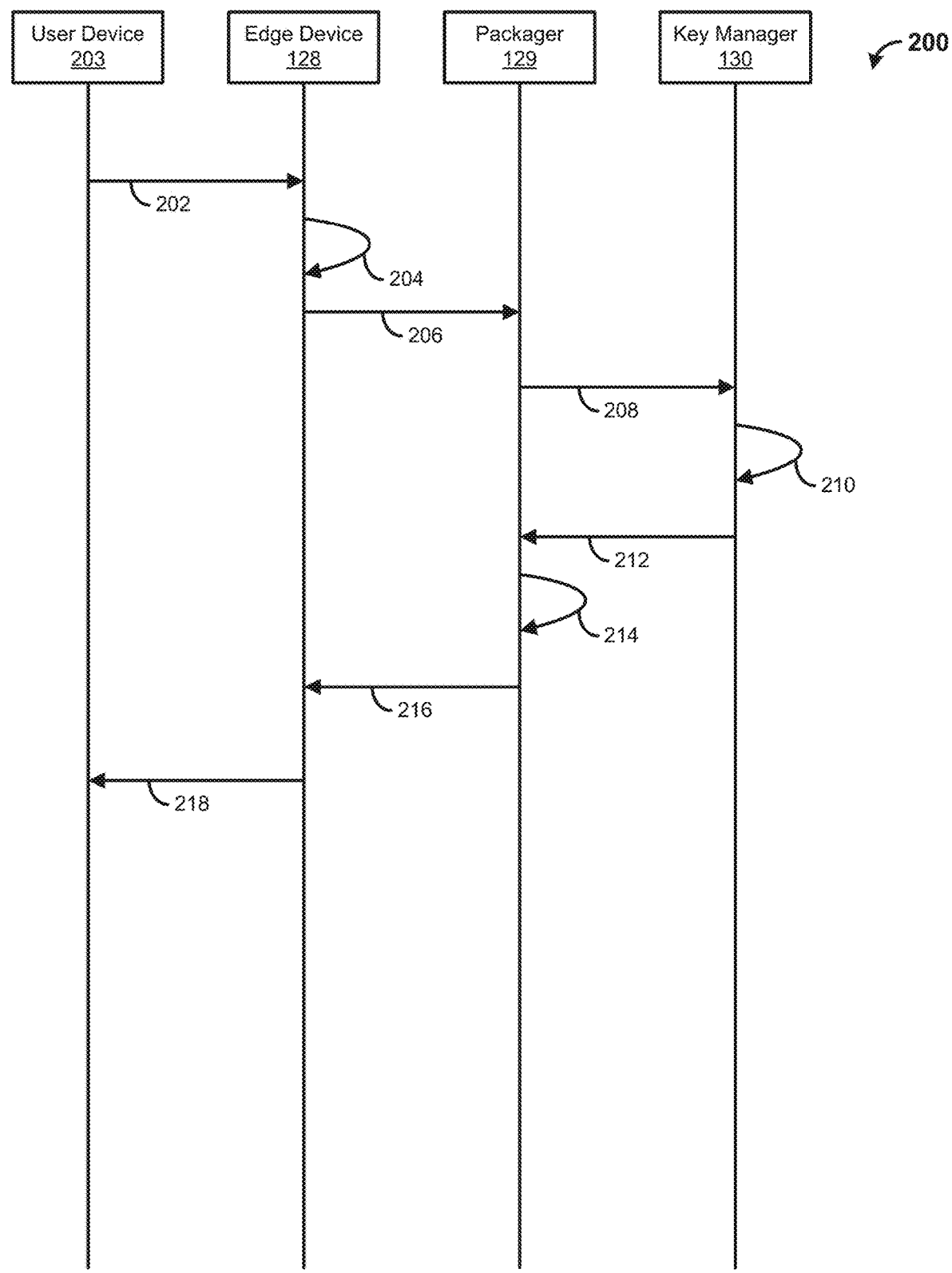
FIG. 2 is a communications flow diagram.

FIG. 2 is an example communications flow diagram 200. Beginning at step 202, a user device 203 transmits, to the edge device 128, a request for a manifest associated with a content item. The content item can be included in one of a plurality of partitions of content items, with each partition having a corresponding time of encryption key rotation and each of partition being associated with one or more content items or one or more portions of content items. The time of encryption key rotation indicates a time at which one or more first encryption keys used to encrypt transmissions of content items in a respective partition are no longer used. Instead, at least one second encryption key is used to encrypt transmissions of content items in the respective partition. The corresponding times of encryption key rotation for each of the partitions can be separated by a predefined interval, e.g., twelve hours, one day, or two days. For example, given 28 partitions of content items, a first partition can be assigned a time of encryption key rotation on the first day of every month, a second partition can be assigned a time of encryption key rotation on the second day of every month, etc. The content items can be partitioned according to a class of content, genre, length of content, frequency of access, or according to other criteria.

In response to receiving the request for the manifest associated with the content item, the edge device 128, at step 204, can determine that a valid instance of the manifest is not stored, e.g., in a cache. For example, the edge device 128 can determine if a manifest matching the requested manifest is not stored in the cache. As another example, the edge device 128 can determine if a time indicated in a header of a stored manifest, e.g., a cache control header, corresponding to a time of encryption key rotation has passed. The edge device 128, at step 206, can transmit a request to the packager 129 for a valid instance of the manifest. In response to the request for a valid instance of the manifest, the packager 129 can transmit, to the key manager 130, a request for an encryption key corresponding to the content item associated with the manifest.

In response to the request for the encryption key, at step 210, the key manager 130 can generate an encryption key for the content item. For example, the key manager 130 can generate the encryption key for the content item based on a respective one of the partitions into which the content item is included, a type or version digital rights management (DRM) type to be applied to the content item, the corresponding time of encryption key rotation, or another factor. The key manager 130 can then, at step 212, transmit the encryption key to the packager 129. The key manager 130 can also transmit, during step 212, DRM metadata associated with the encryption key to the packager 129 facilitating generating a valid instance of the manifest. The DRM metadata can include an identifier for the encryption key, a decryption key corresponding to the encryption key, an identifier for the decryption key corresponding to the encryption key, an identifier of a DRM type or version associated with the content item, or the corresponding time of encryption key rotation for the partition in which the content item is included.

The packager 129 can then generate a valid instance of the manifest at step 214. The valid instance of the manifest can include the encryption key and/or the DRM metadata received from the key manager 130. The valid instance of the manifest can include a headermatching or otherwise corresponding to the corresponding time of encryption key rotation for the content item. The header can comprise cache control data, e.g., a cache control header. The valid instance of the manifest can then be transmitted, e.g., by the packager 129, to the edge device 128 at step 216. The edge device 128 can then transmit the valid instance of the manifest to the user device 203 at step 218.

Figure 3:
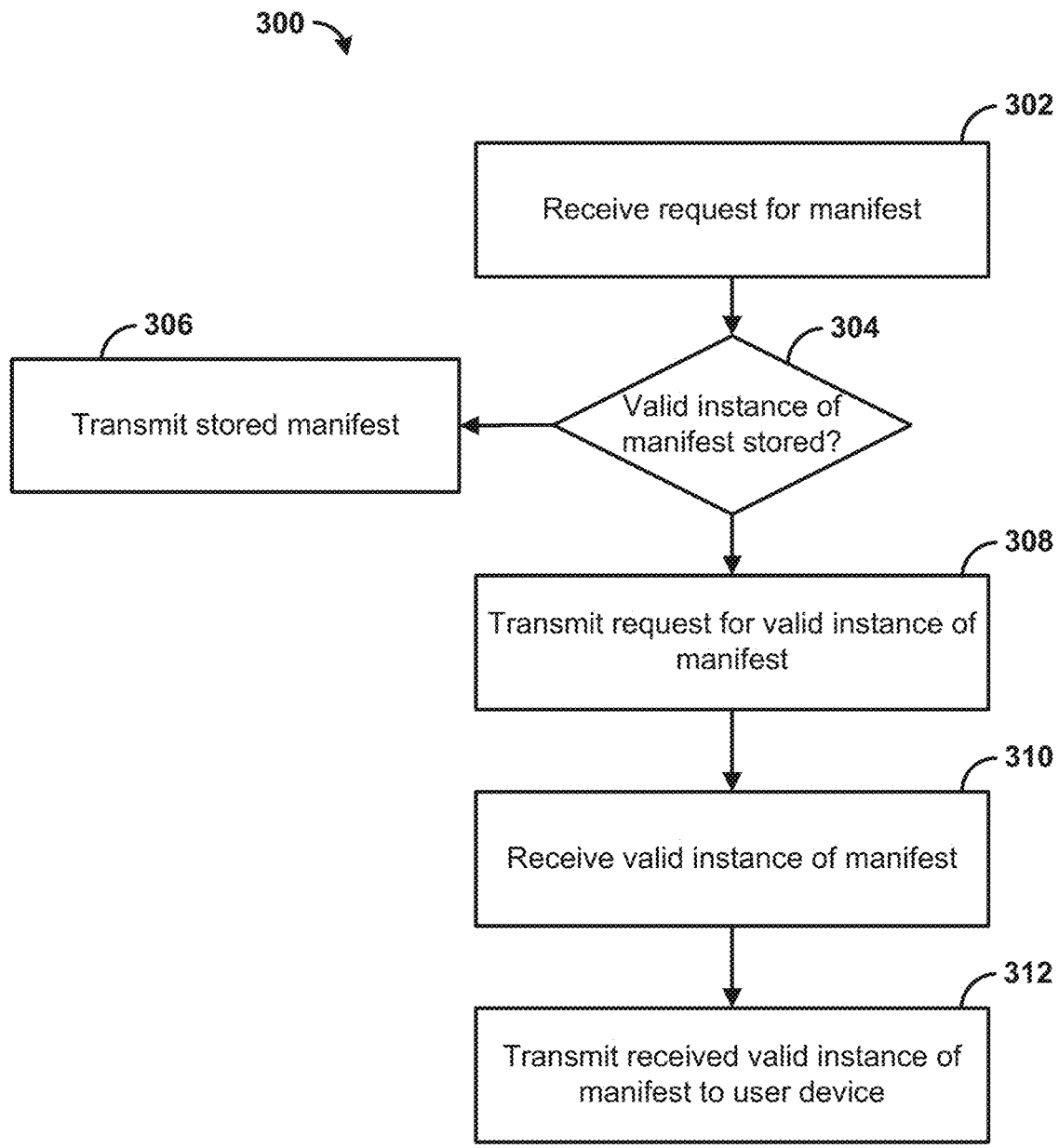
FIG. 3 is a flowchart of an example method.

FIG. 3 is a flowchart 300 of an example method. Beginning with step 302, a request for a manifest associated with a content item can be received, e.g. by the edge device 128 from a user device. The content item can be included in one of a plurality of partitions of content items, with each partition having a corresponding time of encryption key rotation. The time of encryption key rotation indicates a time at which one or more first encryption keys used to encrypt transmissions of content items in a respective partition are no longer used. Instead, at least one second encryption key is used to encrypt transmissions of content items in the respective partition. The corresponding times of encryption key rotation for each of the partitions can be separated by a predefined interval, e.g., twelve hours, one day, or two days. For example, given 28 partitions of content items, a first partition can be assigned a time of encryption key rotation on the first day of every month, a second partition can be assigned a time of encryption key rotation on the second day of every month, etc. The content items can be partitioned according to a class of content, genre, length of content, frequency of access, or according to other criteria.

In response to receiving the request for the manifest associated with the content item, at step 304, it can be determined, e.g., by the edge device 128, if a valid instance of the manifest is stored, e.g., in a cache. For example, determining if a valid instance of the manifest is stored can comprise determining if a manifest matching the requested manifest is stored in the cache. As another example, determining if a valid instance of the manifest is stored can comprise determining if a time indicated in a stored manifest, e.g., indicated in a cache control header, corresponding to a time of encryption key rotation has passed. If the valid instance of the manifest is stored, the method can advance to step 306 where a valid instance of the manifest can be loaded, e.g., from the cache by the edge device 128, and transmitted to the user device.

Otherwise, if a valid instance of the manifest is not stored, the method can advance to step 308 where the edge device 128 can transmit a request, e.g., to the packager 129, for a valid instance of the manifest. At step 310, the valid instance of the manifest can be received, (e.g, by the edge device 129 from the packager 129. The valid instance of the manifest can include an encryption key and/or DRM metadata. The DRM metadata can include an identifier for the encryption key, a decryption key corresponding to the encryption key, an identifier for the decryption key corresponding to the encryption key, an identifier of a DRM type or version associated with the content item, the corresponding time of encryption key rotation for the partition in which the content item is included, combinations thereof, and the like. The valid instance of the manifest can include a header or other data matching or otherwise corresponding to the corresponding time of encryption key rotation for the content item. The header can include cache control data, e.g., a cache control header. The valid instance of the manifest can then be transmitted, e.g., by the edge device 128 to the user device, at step 312.

Figure 4:
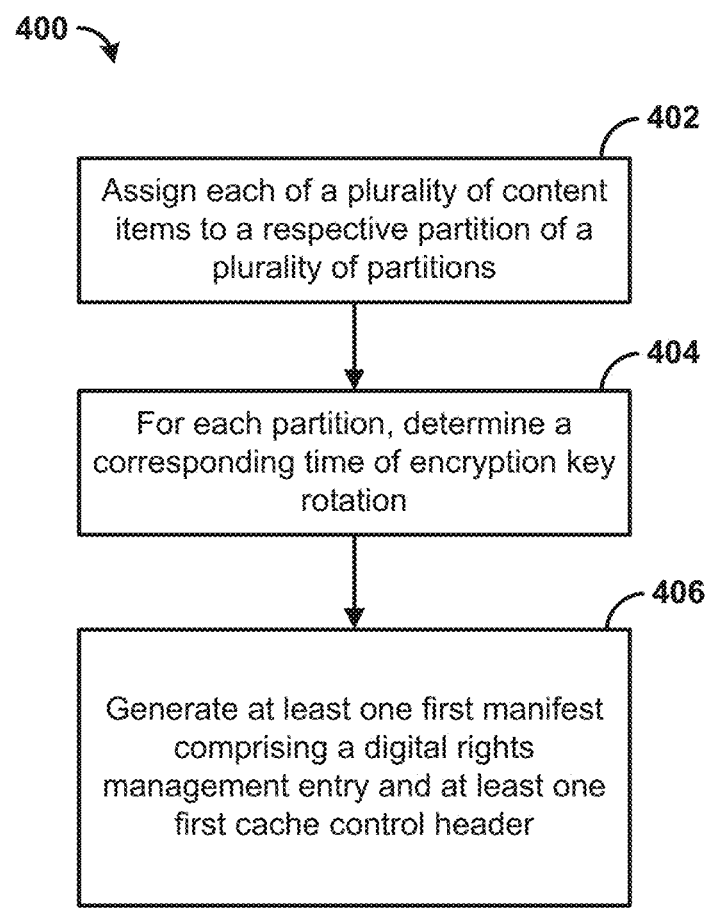
FIG. 4 is a flowchart of an example method.

FIG. 4 is a flowchart 400 of an example method. Beginning with step 402, each of a plurality of content items is assigned to a respective partition of a plurality of partitions, e.g., by a key manager 130. A partition can comprise a logical grouping or classification into which one or more content items are assigned. Each of the plurality of content items can be assigned to a respective partition of the plurality of partitions based on a class of content, genre of content, frequency of access, recency of access or creation, length of content, or another factor. Next, in step 404, for each partition, a corresponding time of encryption key rotation can be determined. The time of encryption key rotation indicates a time at which one or more first encryption keys used to encrypt transmissions of content items in a respective partition, e.g., by a packager 129, are no longer used. Instead, at least one second encryption key is used, e.g., by the packager 129, to encrypt transmissions of content items in the respective partition. The corresponding times of encryption key rotation for each of the partitions can be separated by a predefined interval, e.g., twelve hours, one day, or two days. For example, given 28 partitions of content items, a first partition can be assigned a time of encryption key rotation on the first day of every month, a second partition can be assigned a time of encryption key rotation on the second day of every month, etc.

Next, at step 406, at least one manifest can be generated, e.g., by the packager 129. Generating the valid instance of the manifest can include transmitting, e.g., by the packager 129 to the key manager 130, a request for an encryption key corresponding to the content item associated with the manifest. The encryption key can be generated, e.g., by the key manager 130, based on a respective one of the partitions into which a content item associated with the at least one manifest is included, a type or version digital rights management (DRM) type to be applied to the content item, the corresponding time of encryption key rotation, or another factor.

The at least one manifest can be generated, e.g., by the packager 129, to include the encryption key and/or DRM metadata. The DRM metadata can include an identifier for the encryption key, a decryption key corresponding to the encryption key, an identifier for the decryption key corresponding to the encryption key, an identifier of a DRM type or version associated with the content item associated with the at least one manifest, or the corresponding time of encryption key rotation for the partition in which the content item associated with the manifest is included. At least one manifest can be generated, e.g., by the packager 129, to include data (e.g. a header, such as a cache control header) matching or otherwise corresponding to the corresponding time of encryption key rotation for the content item.

Figure 5:
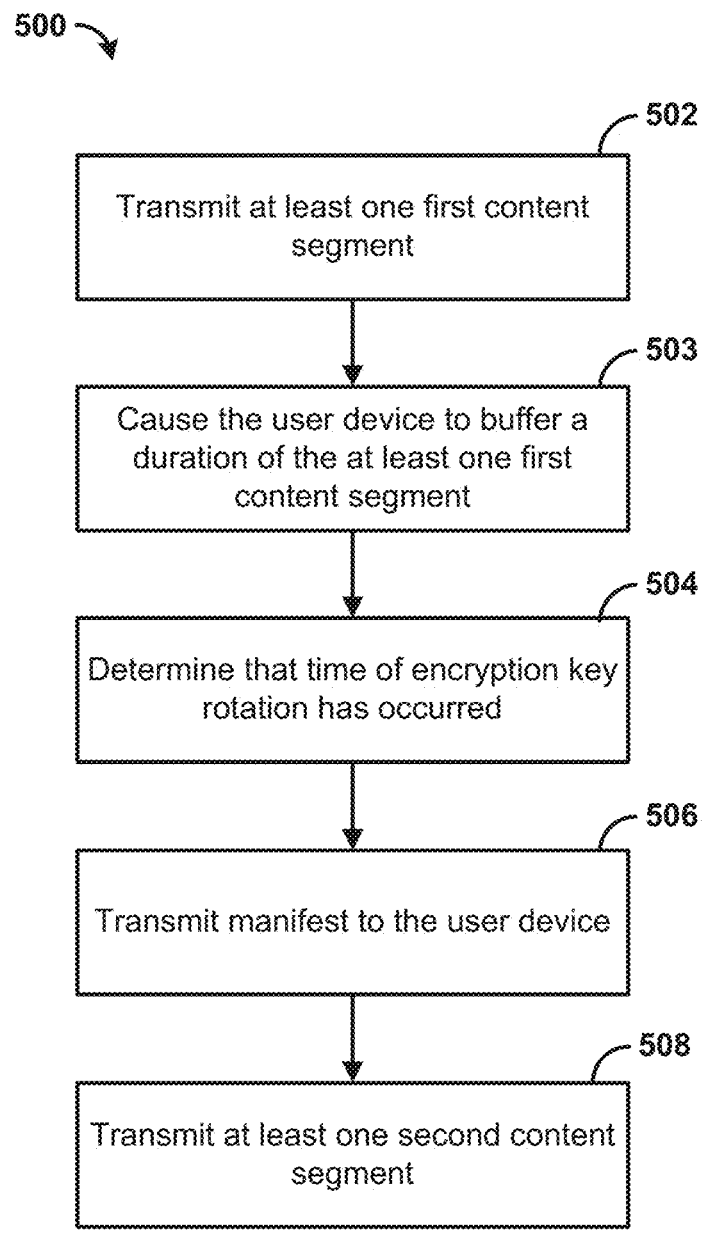
FIG. 5 is a flowchart of an example method.

FIG. 5 is a flowchart 500 of an example method. Beginning with step 502, at least one content segment of a content item can be transmitted, e.g., by an edge device 128 to a user device. The at least one content segment can be transmitted in response to a request for the at least one content segment received from the user device. The at least one content segment can be encrypted according to a first encryption key, e.g., by the packager 129. The first encryption key can correspond to a partition of a plurality of partitions into which the content item is assigned. For example, the content item can be included in a plurality of content items, where each of the plurality of content items is assigned to one of the plurality of partitions. Each of the plurality of content items can be assigned to one of the plurality of partitions based on a content type, a duration of the respective content item, or according to other criteria. The first encryption key can be associated with a corresponding time of encryption key rotation as determined by the partition. For example, each of the plurality of partitions can correspond to one of a plurality of times of encryption key rotation. Each of the plurality of times of encryption key rotation can be separated by a predefined interval, e.g., twelve hours, one day, two days.

At step 503 the user device can be caused, e.g., by the edge device 128, to buffer a duration of the at least one first content segment. For example, the duration of the content item to be buffered by the content item can exceed an amount of time for the user device to receive a decryption key corresponding to a second encryption key, e.g., from a key manager 130. This allows the user device to render and/or display buffered content segments encrypted by the first encryption key as the user device acquires the second encryption key as is set forth below. The duration can be based on an estimated time for the user device to receive the decryption key. The estimated time can be based on current network conditions, previous times for the user device or other user devices to receive decryption keys, or otherwise determined. The duration can also be a duration predefined according to desired results.

At step 504 it can be determined, e.g. by the edge device 128, that the time of encryption key rotation for the content item has occurred. For example, the edge device 128 can determine that a time indicated in cache control data (e.g., a cache control header) of one or more cached content segments of the content item has passed. As another example, the edge device 128 can determine that a time indicated in a manifest associated with the content item has passed. In response to determining that the time of encryption key rotation has occurred, at step 506, a manifest corresponding to a second encryption key can be transmitted, e.g., by the edge device 128 to a user device. For example, the edge device 128 can transmit a request to the packager 129 to generate a manifest. The generated manifest can comprise DRM metadata associated with a second encryption key. The generated manifest can also comprise a header, e.g., a cache control header, corresponding to a next time of encryption key rotation for the content item. The generated manifest can then be transmitted, e.g., by the edge device 128 to the user device. The generated manifest can facilitate an acquisition of the second encryption key by the user device. At step 508, at least one second content segment can be transmitted. e.g., by the edge device 128, that are encrypted, e.g., by the packager 129, using the second encryption key.

Figure 6:
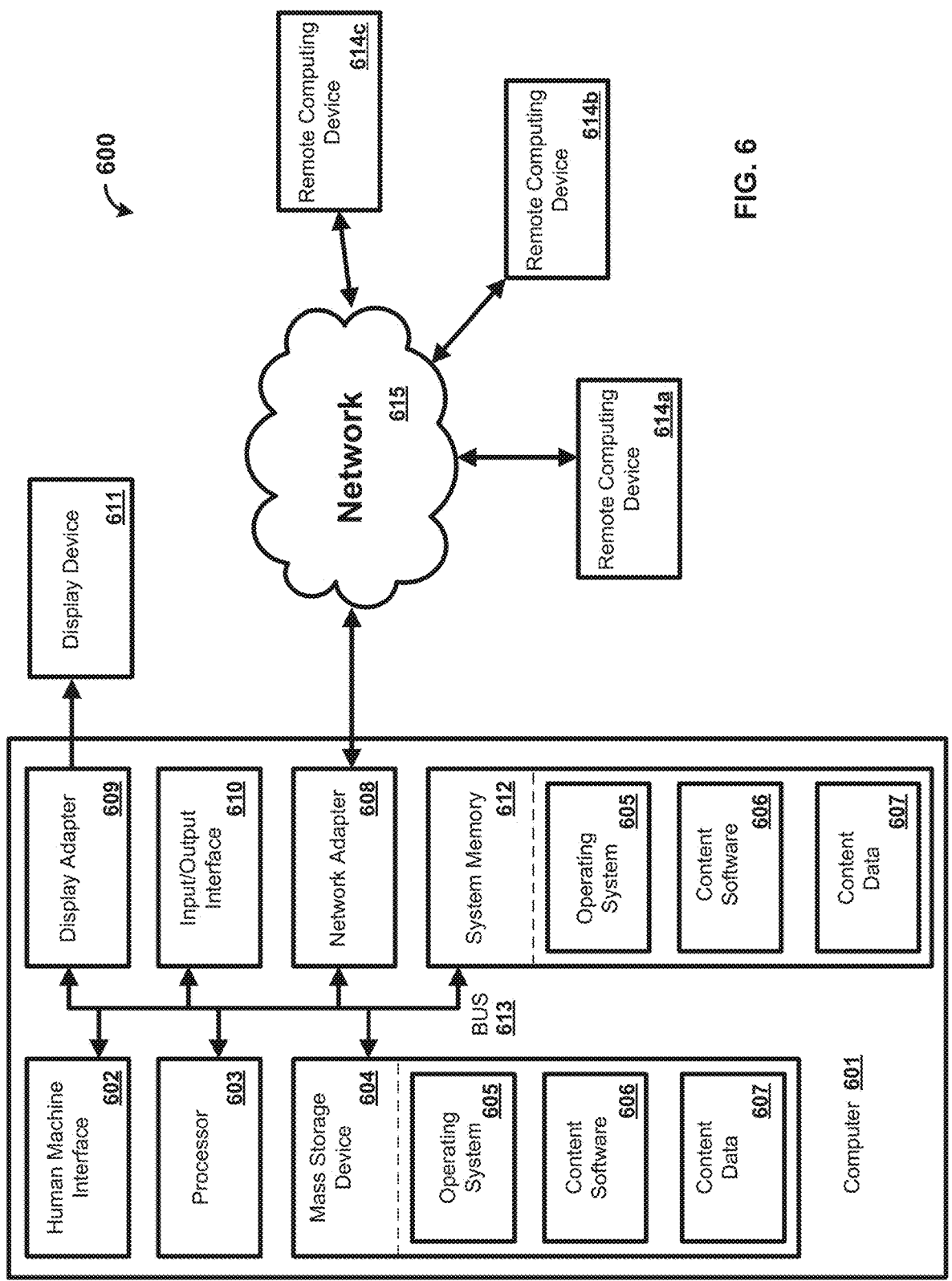
FIG. 6 is a block diagram of an example computing device.

The methods and systems can be implemented on a computer 101 as illustrated in FIG. 6 and described below. By way of example, the edge device 129 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 613, and all buses specified in this description can also be implemented over a wired or wireless network connection and each of the subsystems, including the one or more processors 603, a mass storage device 604, an operating system 605, content software 606, content data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the content data 607 and/or program modules such as the operating system 605 and the content software 606 that are immediately accessible to and/or are presently operated on by the one or more processors 603.

The computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the content software 606. Each of the operating system 605 and the content software 606 (or some combination thereof can comprise elements of the programming and the content software 606. The content data 607 can also be stored on the mass storage device 604. The content data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

The display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the content software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    associating, based on a plurality of frequencies of access, a plurality of content items with a plurality of partitions, wherein each partition is associated with a frequency of access of the plurality of frequencies of access;
    for the plurality of partitions, determining a corresponding plurality of encryption key rotation times; and
    generating, for a content item and based on a corresponding partition of the plurality of partitions, a manifest comprising cache control data indicating an encryption key rotation time.

2. The method of claim 1, further comprising:
    determining, for the manifest, based on the cache control data, that the encryption key rotation time has occurred; and
    generating digital rights management (DRM) metadata associated with the encryption key rotation time.

3. The method of claim 1, wherein generating the manifest comprises sending a request for the manifest.

4. The method of claim 1, wherein each partition of the plurality of partitions corresponds to a respective class of content.

5. The method of claim 1, wherein the content item comprises a version of the content item encrypted according to a corresponding encryption key and comprising the cache control data associated with a corresponding encryption key rotation time.

6. The method of claim 5, further comprising:
    determining that the corresponding encryption key rotation time has occurred based on the cache control data; and
    generating a version of the content item encrypted according to a respective second encryption key and comprising second cache control data based on a next corresponding encryption key rotation time.

7. The method of claim 6, further comprising storing, for a predetermined amount of time, the version of the content item encrypted according to the corresponding encryption key concurrent to storing the version of the content item encrypted according to the second encryption key.

8. The method of claim 7, wherein the predetermined amount of time is based on a length of the content item.

9. The method of claim 5, wherein the corresponding encryption key rotation time is included in a plurality of encryption key rotation times separated by a predefined interval.

10. A method comprising:
associating, based on a frequency of access for each content item of a plurality of content items, each content item of the plurality of content items a partition of with a plurality of partitions, wherein each partition of the plurality of partitions is associated with at least one frequency of access of a plurality of frequencies of access;
for the plurality of partitions, determining a corresponding plurality of encryption key rotation times; and
generating, for a content item of the plurality of content items and based on a corresponding partition of the plurality of partitions, a manifest comprising cache control data indicating an encryption key rotation time.

11. The method of claim 10, further comprising:
determining, for the manifest, based on the cache control data, that the encryption key rotation time has occurred; and
generating digital rights management (DRM) metadata associated with the encryption key rotation time.

12. The method of claim 10, wherein generating the manifest comprises sending a request for the manifest.

13. The method of claim 10, wherein each partition of the plurality of partitions corresponds to a respective class of content.

14. The method of claim 10, wherein the content item comprises a version of the content item encrypted according to a corresponding encryption key and comprising the cache control data associated with a corresponding encryption key rotation time.

15. The method of claim 14, further comprising:
determining that the corresponding encryption key rotation time has occurred based on the cache control data; and
generating a version of the content item encrypted according to a respective second encryption key and comprising second cache control data based on a next corresponding encryption key rotation time.

16. The method of claim 14, further comprising storing, for a predetermined amount of time, the version of the content item encrypted according to the corresponding encryption key concurrent to storing the version of the content item encrypted according to the second encryption key.

17. The method of claim 16, wherein the predetermined amount of time is based on a length of the content item.

18. The method of claim 14, wherein the corresponding encryption key rotation time is included in a plurality of encryption key rotation times separated by a predefined interval.

19. A method comprising:
associating, based on a frequency of access for a content item of a plurality of content items, the content item of the plurality of content items with a partition of a plurality of partitions, wherein each partition of the plurality of partitions is associated with at least one frequency of access of a plurality of frequencies of access;
for the plurality of partitions, determining a corresponding plurality of encryption key rotation times; and
generating, for the content item of the plurality of content items and based on a corresponding partition of the plurality of partitions, a manifest comprising cache control data indicating an encryption key rotation time.

20. The method of claim 19, further comprising:
determining, for the manifest, based on the cache control data, that the encryption key rotation time has occurred; and
generating digital rights management (DRM) metadata associated with the encryption key rotation time.

21. The method of claim 19, wherein generating the manifest comprises sending a request for the manifest.

22. The method of claim 19, wherein each partition of the plurality of partitions corresponds to a respective class of content.

23. The method of claim 19, wherein the content item comprises a version of the content item encrypted according to a corresponding encryption key and comprising the cache control data associated with a corresponding encryption key rotation time.

24. The method of claim 23, further comprising:
determining that the corresponding encryption key rotation time has occurred based on the cache control data; and
generating a version of the content item encrypted according to a respective second encryption key and comprising second cache control data based on a next corresponding encryption key rotation time.

25. The method of claim 23, further comprising storing, for a predetermined amount of time, the version of the content item encrypted according to the corresponding encryption key concurrent to storing the version of the content item encrypted according to the second encryption key.

26. The method of claim 25, wherein the predetermined amount of time is based on a length of the content item.

27. The method of claim 23, wherein the corresponding encryption key rotation time is included in a plurality of encryption key rotation times separated by a predefined interval.

* * * * *